US009715455B1

United States Patent
Purkayastha et al.

(10) Patent No.: US 9,715,455 B1
(45) Date of Patent: Jul. 25, 2017

(54) HINT SELECTION OF A CACHE POLICY

(71) Applicant: Avago Technologies General IP (Singapore) Pte. Ltd, Singapore (SG)

(72) Inventors: Saugata Das Purkayastha, Bangalore (IN); Kishore Kaniyar Sampathkumar, Bangalore (IN)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 385 days.

(21) Appl. No.: 14/282,070

(22) Filed: May 20, 2014

Related U.S. Application Data

(60) Provisional application No. 61/988,489, filed on May 5, 2014.

(51) Int. Cl.
G06F 12/08 (2016.01)
G06F 12/0871 (2016.01)
G06F 12/0815 (2016.01)
G06F 12/122 (2016.01)

(52) U.S. Cl.
CPC ...... *G06F 12/0871* (2013.01); *G06F 12/0815* (2013.01); *G06F 12/122* (2013.01)

(58) Field of Classification Search
CPC ............. G06F 12/0815; G06F 12/0871; G06F 12/122; G06F 12/123
USPC ........................................ 711/136
See application file for complete search history.

(56) References Cited

U.S. PATENT DOCUMENTS

| 5,822,749 A | 10/1998 | Agarwal ........................ 707/2 |
| 6,272,598 B1* | 8/2001 | Arlitt ................ G06F 17/30902 707/E17.12 |
| 7,437,510 B2 | 10/2008 | Rosenbluth et al. ......... 711/118 |
| 7,937,534 B2 | 5/2011 | Madukkarumukumana et al. ............................. 711/138 |
| 8,458,439 B2 | 6/2013 | Arimilli et al. ............... 711/214 |
| 8,606,998 B2* | 12/2013 | Zulauf ................ G06F 12/0862 711/125 |
| 8,694,724 B1* | 4/2014 | Linnell ................ G06F 11/2082 711/113 |
| 2003/0093622 A1* | 5/2003 | Desota ................ G06F 12/0848 711/129 |
| 2003/0115421 A1* | 6/2003 | McHenry ................ H04L 29/06 711/133 |
| 2004/0098541 A1* | 5/2004 | Megiddo ................ G06F 12/122 711/129 |

(Continued)

OTHER PUBLICATIONS

X. Gu and C. Ding, "A Generalized Theory of Collaborative Caching", In Proceedings of the 2012 International Symposium on Memory Management, pp. 109-120, 2012.*

(Continued)

*Primary Examiner* — Reginald Bragdon
*Assistant Examiner* — Aaron D Ho
(74) *Attorney, Agent, or Firm* — Sheridan Ross P.C.

(57) ABSTRACT

An apparatus having an interface and a circuit is shown. The interface is configured to receive a request to access a memory. The request includes a hint. The circuit is configured to select a current one of a plurality of cache policies based on the hint. The current cache policy includes a number of current parameters ranging from some to all of a plurality of management parameters of a cache device. The circuit is further configured to cache data of the request based on the current cache policy.

19 Claims, 8 Drawing Sheets

(56) References Cited

U.S. PATENT DOCUMENTS

| | | | |
|---|---|---|---|
| 2007/0174551 A1* | 7/2007 | Cornwell | G06F 12/0888 711/118 |
| 2007/0266206 A1* | 11/2007 | Kim | G06F 12/0817 711/118 |
| 2008/0005473 A1* | 1/2008 | Chen | G06F 8/4442 711/118 |
| 2008/0177952 A1* | 7/2008 | Morrow | G06F 12/121 711/133 |
| 2009/0182836 A1 | 7/2009 | Aviles et al. | 709/213 |
| 2010/0281216 A1* | 11/2010 | Patel | G06F 12/121 711/118 |
| 2011/0010502 A1* | 1/2011 | Wang | G06F 12/121 711/128 |
| 2011/0161608 A1* | 6/2011 | Bellows | G06F 12/0802 711/162 |
| 2012/0079206 A1* | 3/2012 | Zhao | H04L 67/2852 711/134 |
| 2012/0117324 A1* | 5/2012 | Solina, II | G06F 12/0871 711/118 |
| 2013/0262736 A1 | 10/2013 | Kegel et al. | 711/3 |
| 2014/0075125 A1* | 3/2014 | Biswas | G06F 12/08 711/136 |
| 2014/0244898 A1* | 8/2014 | Liu | G06F 12/126 711/103 |
| 2014/0372699 A1* | 12/2014 | Desai | G06F 12/0893 711/118 |

OTHER PUBLICATIONS

X. Gu and C. Ding, "On the Theory and Potential of LRU-MRU Collaborative Cache Management", In Proceedings of the 2011 International Symposium on Memory Management, pp. 43-54, 2011.*

* cited by examiner

HINT SELECTION OF A CACHE POLICY

This application relates to U.S. Provisional Application No. 61/988,489, filed May 5, 2014, which is hereby incorporated by reference in its entirety.

FIELD OF THE INVENTION

The invention relates to cache management generally and, more particularly, to a method and/or apparatus for implementing a hint selection of a cache policy.

BACKGROUND

Some conventional host computers pass a hint with a request for a memory access to data. The hint carries information on if and how the data should be treated differently from regular data. However, since a size of the hint is fixed, the amount of information that can be hinted is limited. Furthermore, any new caching parameters added to the requests result in changes in hint drivers in the host and changes in cache management firmware. With complex caching software and a wide range of use cases, the conventional hint architecture is not sufficiently scalable.

SUMMARY

The invention concerns an apparatus having an interface and a circuit. The interface is configured to receive a request to access a memory. The request includes a hint. The circuit is configured to select a current one of a plurality of cache policies based on the hint. The current cache policy includes a number of current parameters ranging from some to all of a plurality of management parameters of a cache device. The circuit is further configured to cache data of the request based on the current cache policy.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the invention include providing a hint selection of a cache policy that may (i) expand a number of cache parameters that can be hinted, (ii) create multiple instantiations of a cache policy, (iii) customize each cache policy instantiation, (iv) operate with a fixed size hint and/or (v) be implemented as one or more integrated circuits.

Embodiments of the invention define a cache management policy by grouping together some to all available cache management parameters of a cache device. Subsequently, multiple instances of the cache policy are customized by initializing the grouped parameters. A hint from each access (or data transfer) request points to a selected instance of the cache policy instances. Caching software thus applies all applicable cache management parameters from the selected cache policy instance to the host data.

Figure 1:
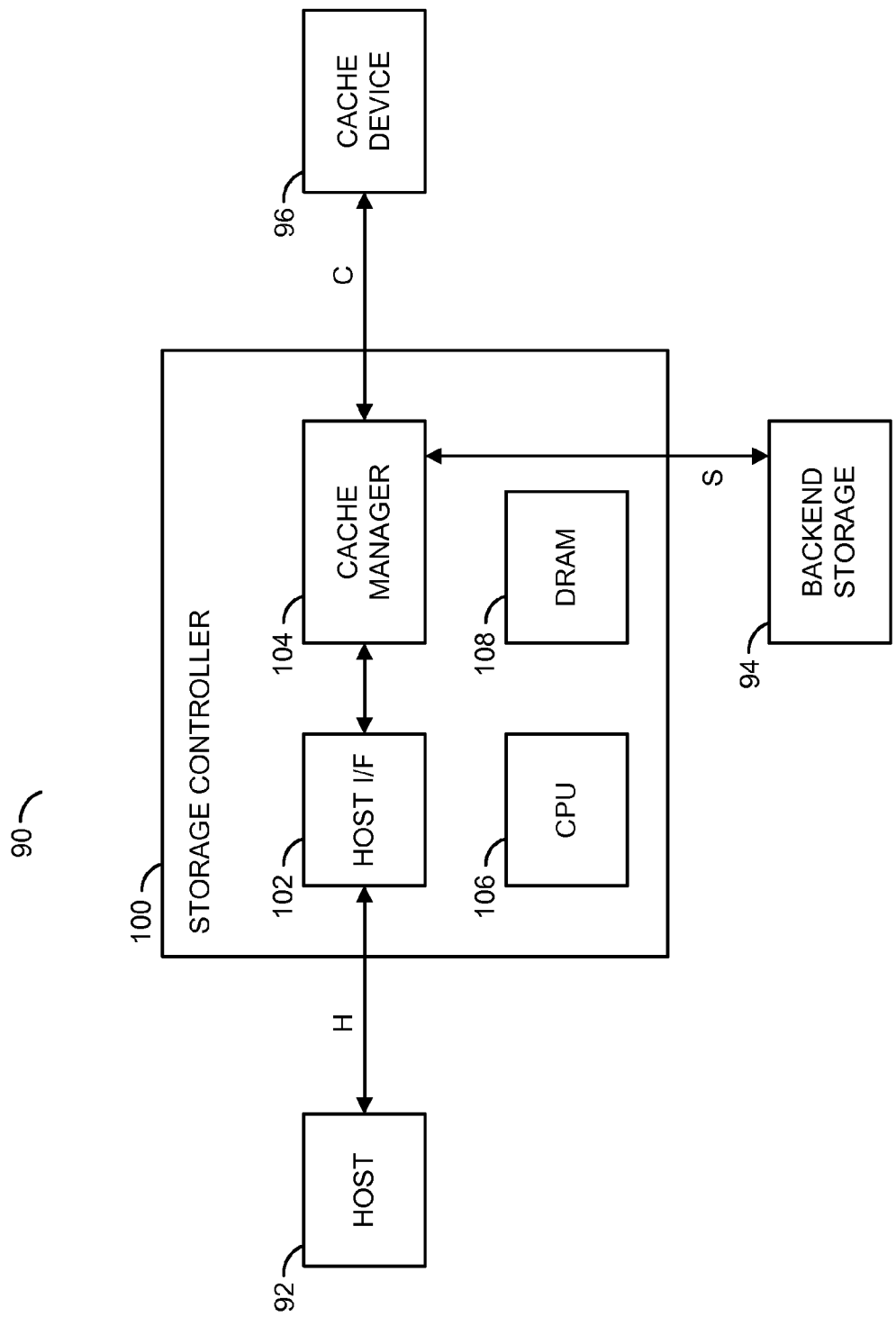
FIG. 1 is a diagram of a system.

Referring to FIG. 1, a diagram of an example implementation of a system 90 is shown. The apparatus (or circuit or device or integrated circuit) 90 implements a computer having a memory circuit. The apparatus 90 generally comprises a block (or circuit) 92, a block (or circuit) 94, a block (or circuit) 96 and a block (or circuit) 100. The circuit 100 generally comprises a block (or circuit) 102, a block (or circuit) 104, a block (or circuit) 106 and a block (or circuit) 108. The circuits 92 to 108 may be represented as modules and/or blocks, embodiments of which include hardware (circuitry), code (e.g., hardware description languages (HDLs) such as register-transfer level (RTL), Verilog, etc.) used by one or more electronic design tools, computer executable code in a storage device, software and associated hardware executing the software, and/or other implementations.

One or more signals (e.g., H) are exchanged between the circuit 92 and the circuit 100. The host input/output signal H generally includes, but is not limited to, a logical address component used to access data in the circuit 94, a host command component that controls the circuit 94, a write data component that transfers write data from the circuit 92 to the circuit 100, a read data component that transfers error corrected read data from the circuit 100 to the circuit 92, and a hint for the write data and the read data. One or more signals (e.g., S) are exchanged between the circuit 100 and the circuit 94. The storage input/output signal S generally includes, but is not limited to, a physical address component used to access data in the circuit 94, a memory command component that controls the circuit 94 (e.g., read or write commands), a write codeword component that carries error correction coded and cyclical redundancy check protected write codewords written from the circuit 100 into the circuit 94 and a read codeword component that carries the error correction coded codewords read from the circuit 94 to the circuit 100. One or more signals (e.g., C) are exchanged between the circuit 100 and the circuit 96. The cache signal C generally includes, but is not limited to, a virtual address component, the write codeword component and the read codeword component.

The circuit 92 is shown implemented as a host circuit. The circuit 92 is generally operational to read and write data to and from the circuit 94 via the circuit 100. When reading or writing, the circuit 92 transfers a logical address value in the signal H to identify which set of data is to be written or to be read from the circuit 94. The address generally spans a logical address range of the circuit 94. The logical address can address individual data units, such as SATA (e.g., serial-ATA) sectors.

The circuit 94 is shown implementing a backend storage device (or circuit). According to various embodiments, the circuit 94 comprises one or more semiconductor devices, one or more magnetic devices and/or one or more optical devices. When data is read from the circuit 94, the circuit 94 accesses a set of data (e.g., multiple bits) identified by the address (e.g., a physical address) in the signal S. The address generally spans a physical address range of the circuit 94.

The circuit 96 is shown implementing a cache memory device. The circuit 96 is operational to buffer temporarily the data received from the circuit 92 and/or received from the circuit 94 via the signal C. The circuit 96 is generally controlled by the circuit 100 based on one or more cache policy instances. The circuit 96 may or may not be associated with the circuit 94. If the circuit 96 is associated with the circuit 94, the circuit 94 is said to be configured for caching. Else, the circuit 94 is said to be configured to by-pass the caching.

The circuit 100 is shown implementing a controller circuit. The circuit 100 is generally operational to control reading to and writing from the circuit 94. The circuit 100 includes an ability to buffer data received from the circuit 92 and/or the circuit 94 in the circuit 96. The circuit 100 also includes an ability to transfer data from the circuit 96 to the circuit 92 and/or the circuit 94. The circuit 100 comprises one or more integrated circuits (or chips or die) implementing the controller of one or more memory circuits, solid-state drives, embedded storage, or other suitable control applications.

The circuit 102 is shown implementing a host interface circuit. The circuit 102 is operational to communication with the circuit 92 via the signal H. The communication includes receiving requests from the circuit 92 to access the circuit 94. The requests include read requests, write requests and command requests. Each request to read data or write data includes a hint value (or field). Other signals may be implemented between the circuits 92 and 102 to meet the criteria of a particular application.

The circuit 104 is shown implementing a cache manager circuit. The circuit 104 is generally operational to manage flow of data among the circuit 92, the circuit 94 and the circuit 96. The management includes (i) selecting a current one of multiple cache policy instances based on a hint received from the circuit 92 via an access request and (ii) cache data of the request based on the current cache policy instance. The current cache policy instance generally comprises a number of current parameters ranging from some to all of the management parameters of the circuit 96.

The circuit 104 has a cache manager component that is responsible for identifying hot data requested by the circuit 92 and managing the hot data in the circuit 96. The circuit 104 tracks hot data in units of cache windows and allocates cache space by dividing a cache window into cachelines and subcachelines. Different cache management parameters influence the following actions of the circuit 104: method of identifying the hot data; method of classifying among the hot data; method of reclaiming space in the circuit 96; and method of identifying an amount of cacheline fills or sub-cacheline fills.

Tuning one or more cache management parameters generally helps in improving the performance of the circuit 104. With cache management processes getting complex, a list of the cache management parameters for the hot data management is getting larger. The circuit 102 generally receives a hint in the form of a few bytes via the signal H. Each hint points to a cache policy instance with multiple cache management parameters. Several parameters include, but are not limited to: whether the data is hot and if so immediately cache the data; an amount of a cacheline fill in case of a cache miss; and the type of caching process to be performed. The types generally include, but are not limited to: sticky types where the data is not removed from the circuit 96; volatile types where the data is not always saved to the circuit 94; no cache type if the data should not be cached; priority cache types in which the data should be considered a higher priority based on a frequency of access; and read-write-discard types that free the data from the circuit 96 once that data has been read.

The circuit 106 is shown implementing a central processor unit (e.g., CPU) circuit. The circuit 106 is operational to command and/or assist with the read/write requests and to control the circuit 94. In some embodiments where the circuit 104 is implemented in firmware, the circuit 106 executes the cache manager operations. In various embodiments, the circuit 106 is operational to perform some to all of the error correction coding and/or decoding of the data stored in the circuit 94.

The circuit 108 is shown implementing a memory circuit. The circuit 108 is operational to store information and data generated by and consumed by the circuits 104 and 106. In some embodiments, the circuit 108 is implemented as a dynamic random access memory (e.g., DRAM). In other embodiments, the circuit 108 is implemented as a static random access memory (e.g., SRAM). Other memory technologies may be implemented to meet the criteria of a particular application.

Figure 2:
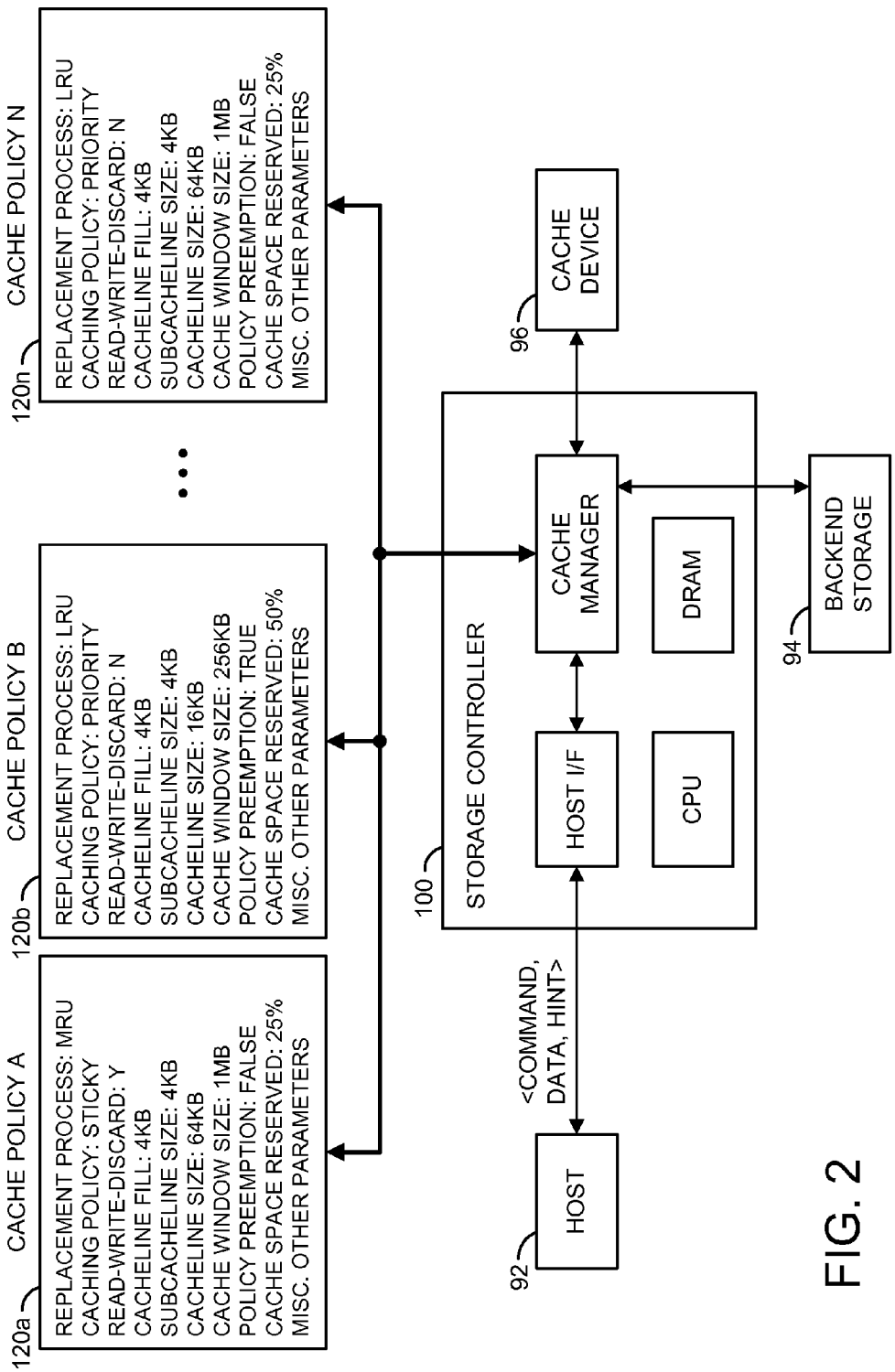
FIG. 2 is a diagram illustrating multiple cache policy instances in accordance with an embodiment of the invention.

Referring to FIG. 2, a diagram illustrating multiple cache policy instances is shown in accordance with an embodiment of the invention. The circuit 104 creates multiple instances 120a-120n of a cache policy by grouping together all the cache management parameters. Each cache policy instance is customized by initializing the cache management parameters. In some embodiments, the circuit 92 can define the number of cache policy instances and initialize each cache policy instance. In various embodiments, the circuit 92 may initialize the cache policy instances in the circuit 100 using a tool, such as a megaRAID storage manager (e.g., MSM). In other embodiments, the circuit 100 defines the number of cache policy instances and initializes the cache management parameters based on setup data stored within the circuit 100.

The host data carries a hint that indicates (or selects) a current one of the cache policy instances. Based on the hint, the circuit 104 applies the corresponding cache policy to the host data. Each cache policy instance has an associated handler. In some embodiments, all handlers are executed in the context of the cache manager. In other embodiments, the cache manager creates a task per cache policy instance and the handlers are run in separate tasks.

The circuit 104 defines a policy management parameter, referred to as policy preemption parameter. The policy preemption parameter generally indicates whether a cache window can be removed from an existing cache policy instance and added to a different cache policy instance. The circuit 104 also defines a cache replacement policy of either least recently used (e.g., LRU) or most recently used (e.g., MRU). The cache replacement policy indicates whether the cache window should be replaced in a least-recently-used order or a most-recently-used order. The circuit 104 defines another policy parameter, referred to as cache space reserved parameter. The cache space reserved parameter generally indicates a percentage of cache space that will be reserved for the corresponding cache policy instance.

Figure 3:
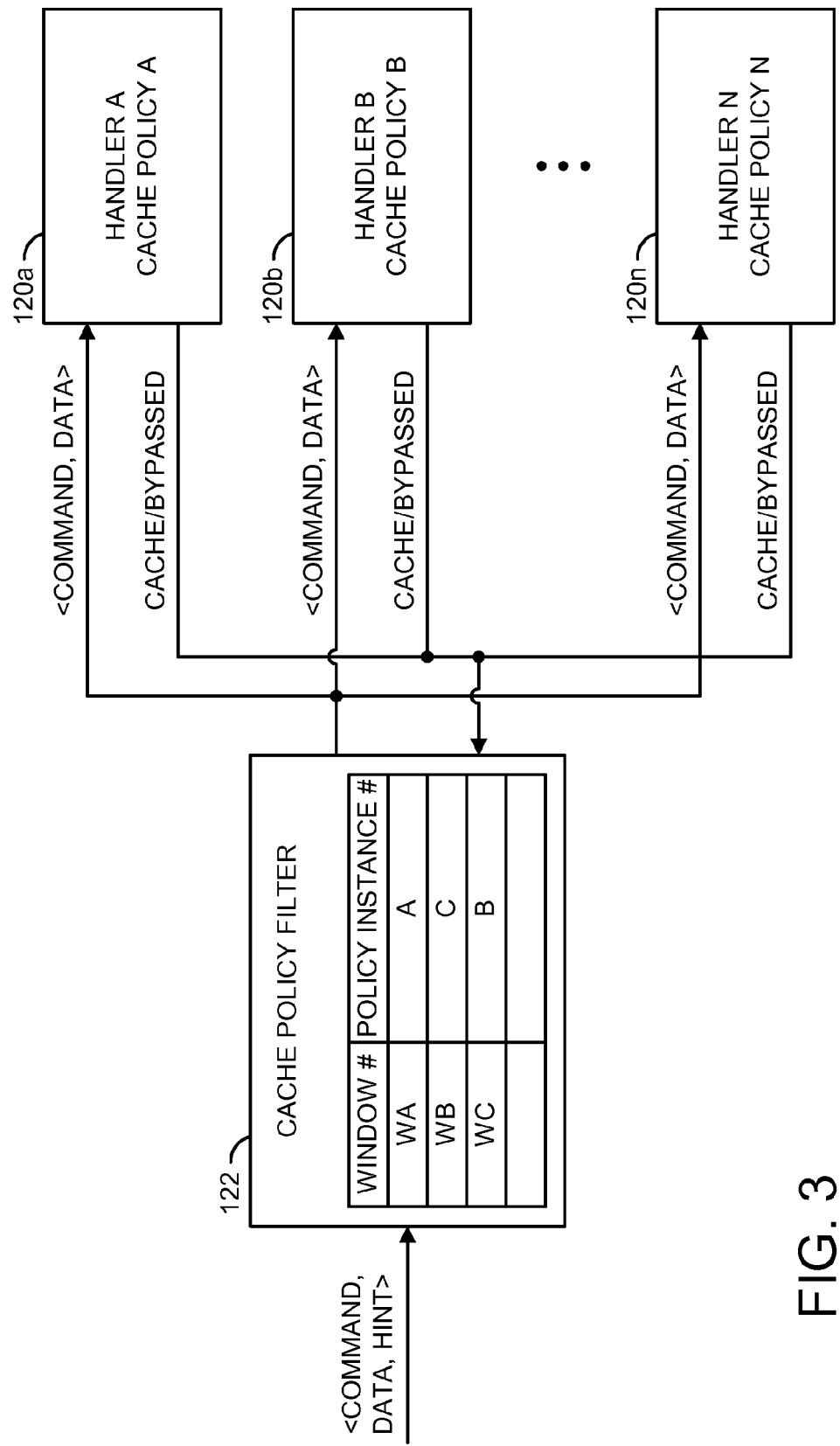
FIG. 3 is a diagram of a cache policy filter based on a hint.

Referring to FIG. 3, a diagram of a cache policy filter based on the hint is shown. The circuit 104 includes a cache policy filter (or circuit) 122. The cache policy filter 122 is generally configured to track a window number (e.g., derived by dividing the requested block number of the backend storage by the size of the cache window which is smallest across all the cache policy instances) and a current cache policy instance applied on the window. In some instances, the cache policy filter 122 runs in the same context as the cache manager task. If the window does not have an entry in the cache policy filter, the hint of the data indicates the cache policy instance and the data is routed to the handler of the cache policy instance. In various embodiments, the hint conveys both the existing cache policy instance and the new cache policy instance. In such a case, the existing cache policy instance hint is used to find the policy instance that is currently handling the window.

If the cache policy filter 122 has an entry for the window (e.g., window WA has cache policy instance A), the data request is either (i) routed to the existing policy instance or (ii) the instance indicated in the hint, depending on the preemption policy parameter of the current cache policy instance property. Where the existing policy instance has a false preemption policy, the existing policy instance is not preempted. Where the existing policy instance has a true preemption policy, the existing policy instance can be preempted by another policy instance provided in the hint.

If the data request is a cache hit within the given cache policy instance, the handler of the cache policy instance sends a cached status to the cache policy filter 122. The cache policy filter 122 subsequently registers the cached entry for the corresponding window. If the data bypassed the circuit 96, a bypassed status is sent to the cache policy filter 122. The cache policy filter 122 does not add any entry for the corresponding window in response to the bypass notification.

Figure 4:
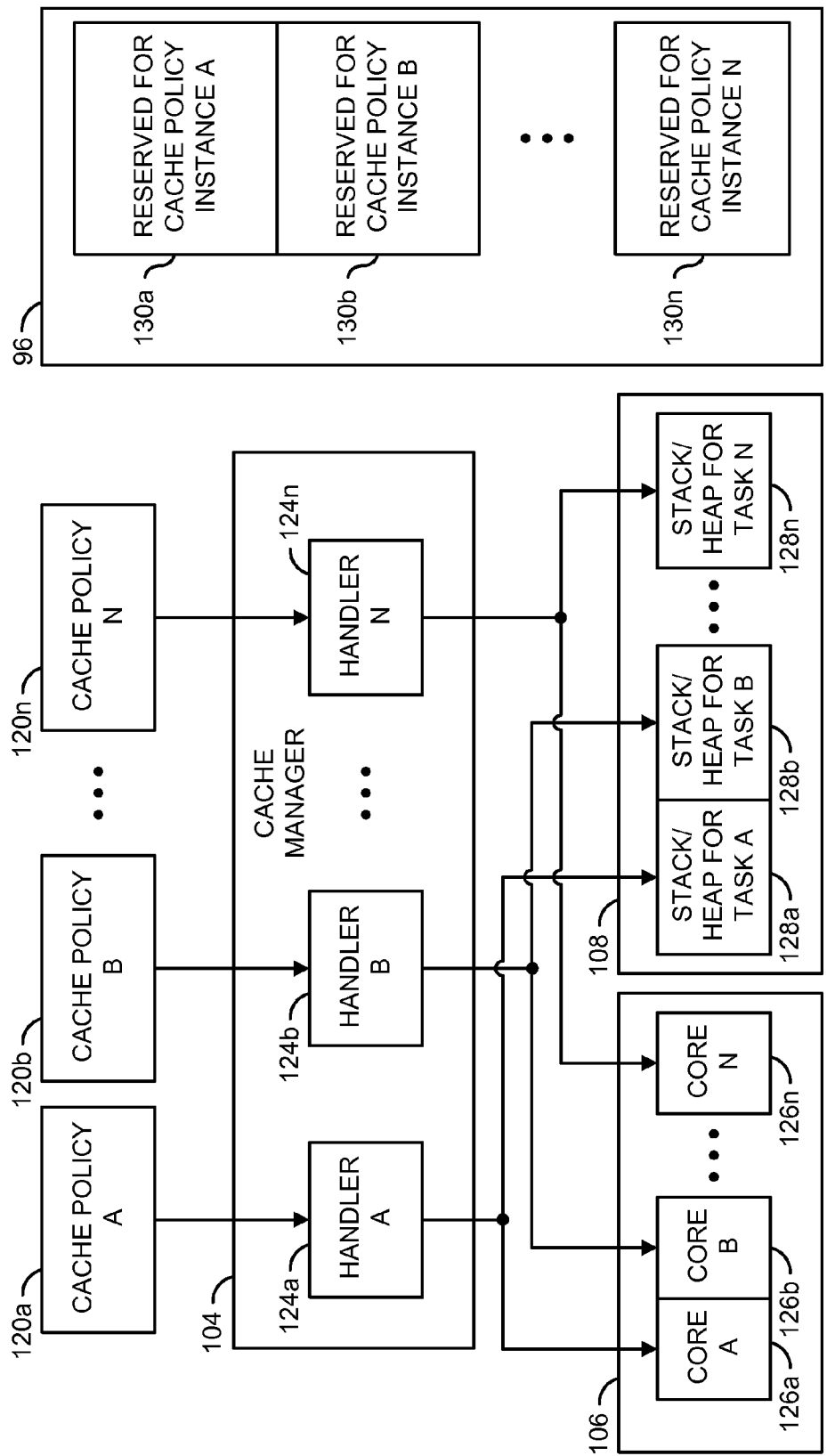
FIG. 4 is a diagram of a cache management flow.

Referring to FIG. 4, a diagram of an example cache management flow is shown. The circuit 104 is shown executing multiple handlers 124a-124n. The circuit 106 is shown implementing multiple core processors 126a-126n. The circuit 108 is shown parsed into multiple stacks/heaps 128a-128n. The circuit 96 is shown with reserved spaces 130a-130n for each of the various cache policy instances 120a-120n.

In various embodiments, a timeshared part of the circuit 106 (or a different core of the circuit 106) and part of the circuit 108 is reserved for each handler 124a-124n of the cache manager 104. A space of the circuit 96 is split into regions reserved for each cache policy instance 120a-120n, depending on a cache space reserved parameter. For example, handler 124a of the circuit 104 is illustrated managing a cache policy 120a, runs on core 126a of the circuit 106, works in a corresponding space 128a in the circuit 108 and works in a corresponding space 130a in the circuit 96. Other arrangements of the circuits 96 and 104-108 may be implemented to meet the criteria of a particular application.

Figure 5:
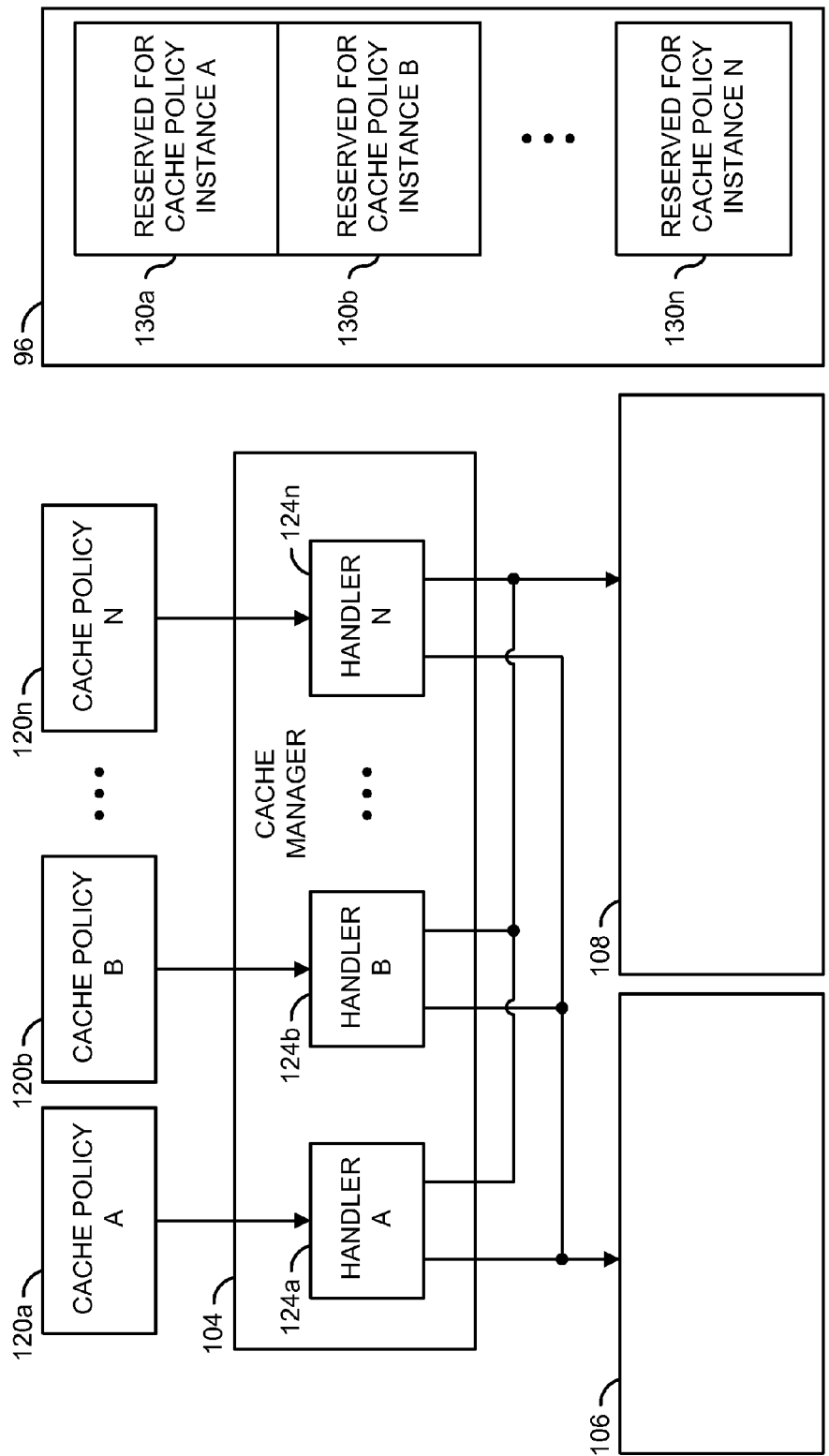
FIG. 5 is a diagram of another cache management flow.

Referring to FIG. 5, a diagram of another example cache management flow is shown. In the illustrated example, the handlers 124a-124n share the available resources in the circuits 106 and 108. The circuit 96 is divided among cache policy instances 120a-120n, depending on the cache space reserved parameter.

The circuit 104 is responsible for creating the cache policy instances 120a-120n either based on host requests and/or based on pre-configuration information. The circuit 104 is also responsible for creating a task per cache policy instance 120a-120n and routing the data transfer requests to the handlers 124a-124n of the cache policy instance 120a-120n.

Figure 6:
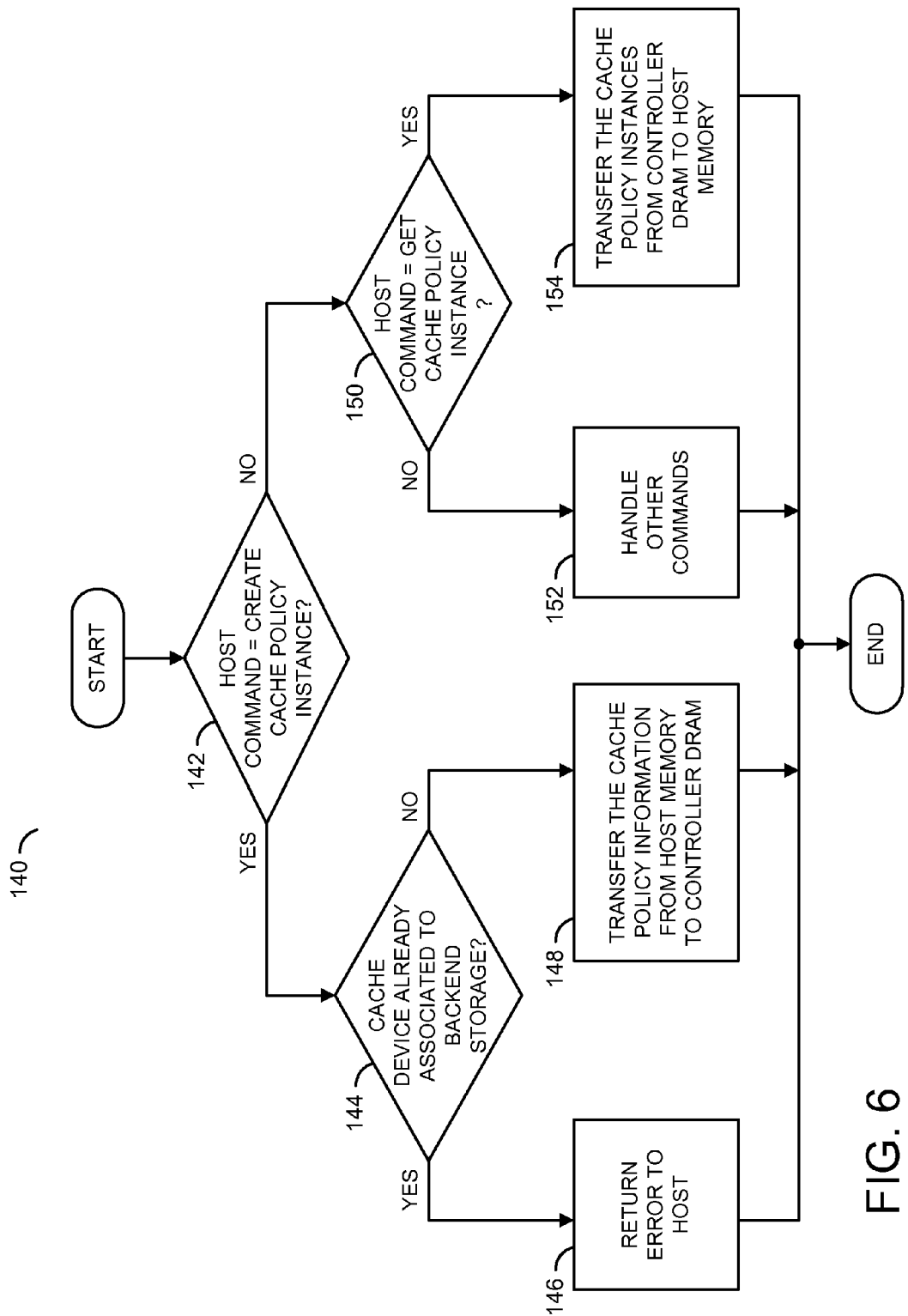
FIG. 6 is a diagram of a method for handling host commands.

Referring to FIG. 6, a diagram of an example method 140 for handling host commands is shown. The method (or process) 140 is performed by the circuit 100. The method 140 generally comprises a step (or state) 142, a step (or state) 144, a step (or state) 146, a step (or state) 148, a step (or state) 150, a step (or state) 152 and a step (or state) 154. The steps 142-154 may be represented as modules and/or blocks, embodiments of which include hardware (circuitry), code (e.g., hardware description languages (HDLs) such as register-transfer level (RTL), Verilog, etc.) used by one or more electronic design tools, computer executable code in a storage device, software and associated hardware executing the software, and/or other implementations.

In the step 142, the circuit 100 determines if a host command has been received to create a new cache policy instance. If a new cache policy instance has been commanded, the circuit 100 checks in the step 144 to determine if the circuit 96 is already associated with the circuit 94. If an existing association is found, an error message is returned by the circuit 100 to the circuit 92 in the step 146 since the existing caching policy instance should not be changed.

In the case where no association has been found between the circuit 96 and the circuit 94, the circuit 100 pulls the instance data into the circuit 108 in the step 148. In some embodiments, the circuit 100 generates the new cache policy instance based on information received from the circuit 92. Once the circuit 94 is associated with the circuit 96, the circuit 104 creates all of the handlers 124a-124n and the tasks for each cache policy instance 120a-120n.

If the host command is not to create a cache policy instance, the circuit 100 performs a check in the step 150 to determine is the circuit 92 wants to read one or more cache policy instances. If no cache policy instance read is requested, the circuit 100 handles (or processes) the host command in the step 152. When the circuit 92 reads the cache policy instances, the cache policy instance data is transferred from the circuit 100/108 to the circuit 92 in the step 154.

Figure 7:
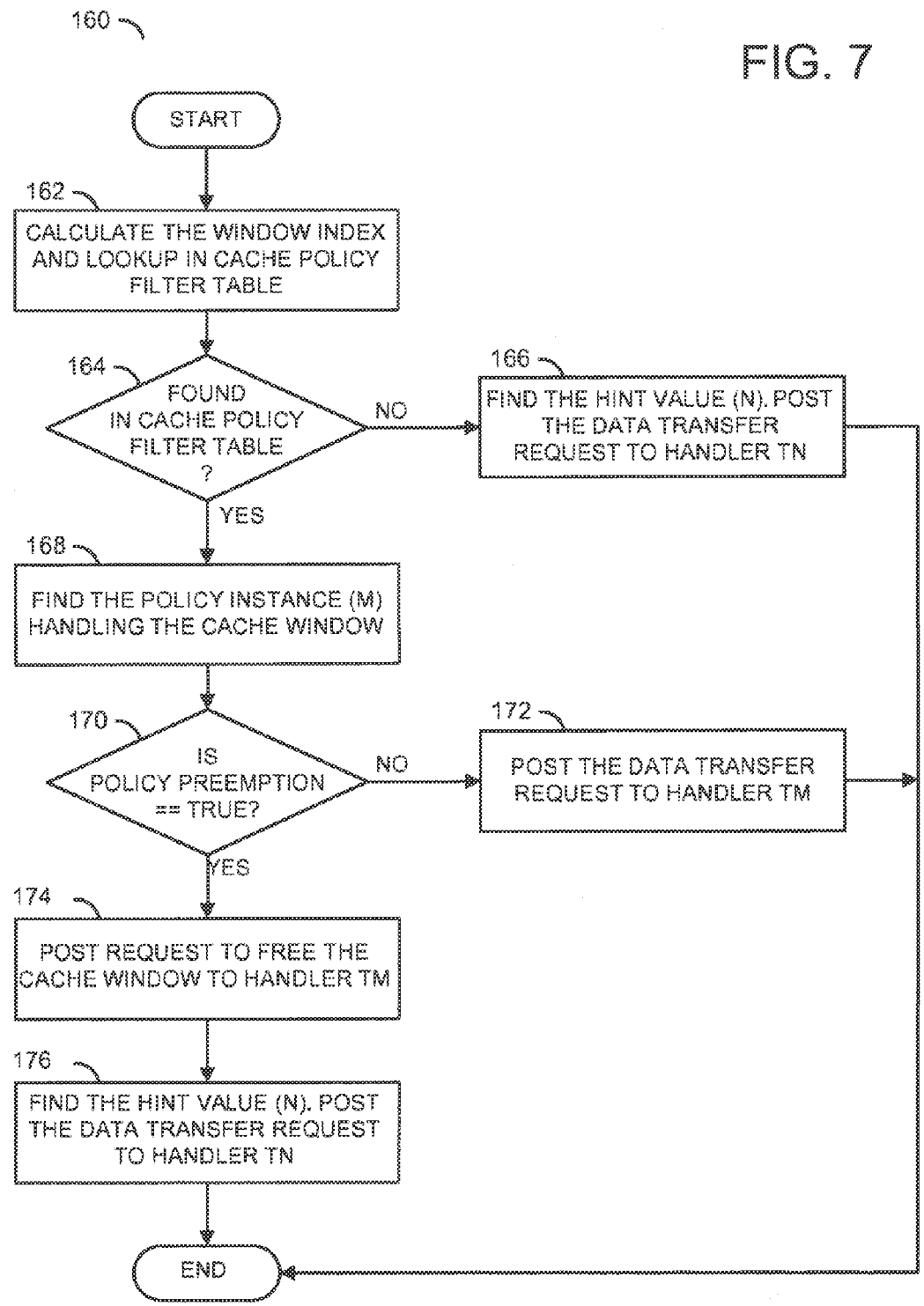
FIG. 7 is a diagram of a method for handling hot data.

Referring to FIG. 7, a diagram of an example method 160 for handling hot data is shown. The method (or process) 160 is performed by the circuit 100. The method 160 generally comprises a step (or state) 162, a step (or state) 164, a step (or state) 166, a step (or state) 168, a step (or state) 170, a step (or state) 172, a step (or state) 174 and a step (or state) 176. The steps 162-176 may be represented as modules and/or blocks, embodiments of which include hardware (circuitry), code (e.g., hardware description languages (HDLs) such as register-transfer level (RTL), Verilog, etc.) used by one or more electronic design tools, computer executable code in a storage device, software and associated hardware executing the software, and/or other implementations. Based on the cache policy filter lookup and policy preemption parameter, the circuit 104 chooses a handler 124a-124n to complete the data request and posts the data transfer request to the corresponding task.

In the step 162, the circuit 100 calculates a window index and a lookup in the cache policy filter table 122. A check is performed by the circuit 100 in the step 164 to determine if the window index is found or not in the cache policy filter table 122. If the window index from the request is not found, the circuit 100 finds a hint value (e.g., hint N) in the step 166 and posts the data transfer request to the corresponding handler (e.g., handler TN).

If the window index is found in the cache policy filter table 122, the circuit 100 reads the cache policy instance (e.g., instance M) in the step 168 already allocated to the cache window. If the preemption parameter of the just-found cache policy instance m is not true per the step 170, no preemption takes place and the data transfer request is posted to the corresponding handler (e.g., 15 handler TM) in the step 172.

If the preemption parameter of the cache policy instance m is true, the circuit 100 posts a request to free the cache window from the handler TM in the step 174. In the step 176, the circuit 100 finds the hint value (e.g., hint N)

received from the circuit 92 and posts the data transfer request to the corresponding handler (e.g., handler TN).

Figure 8:
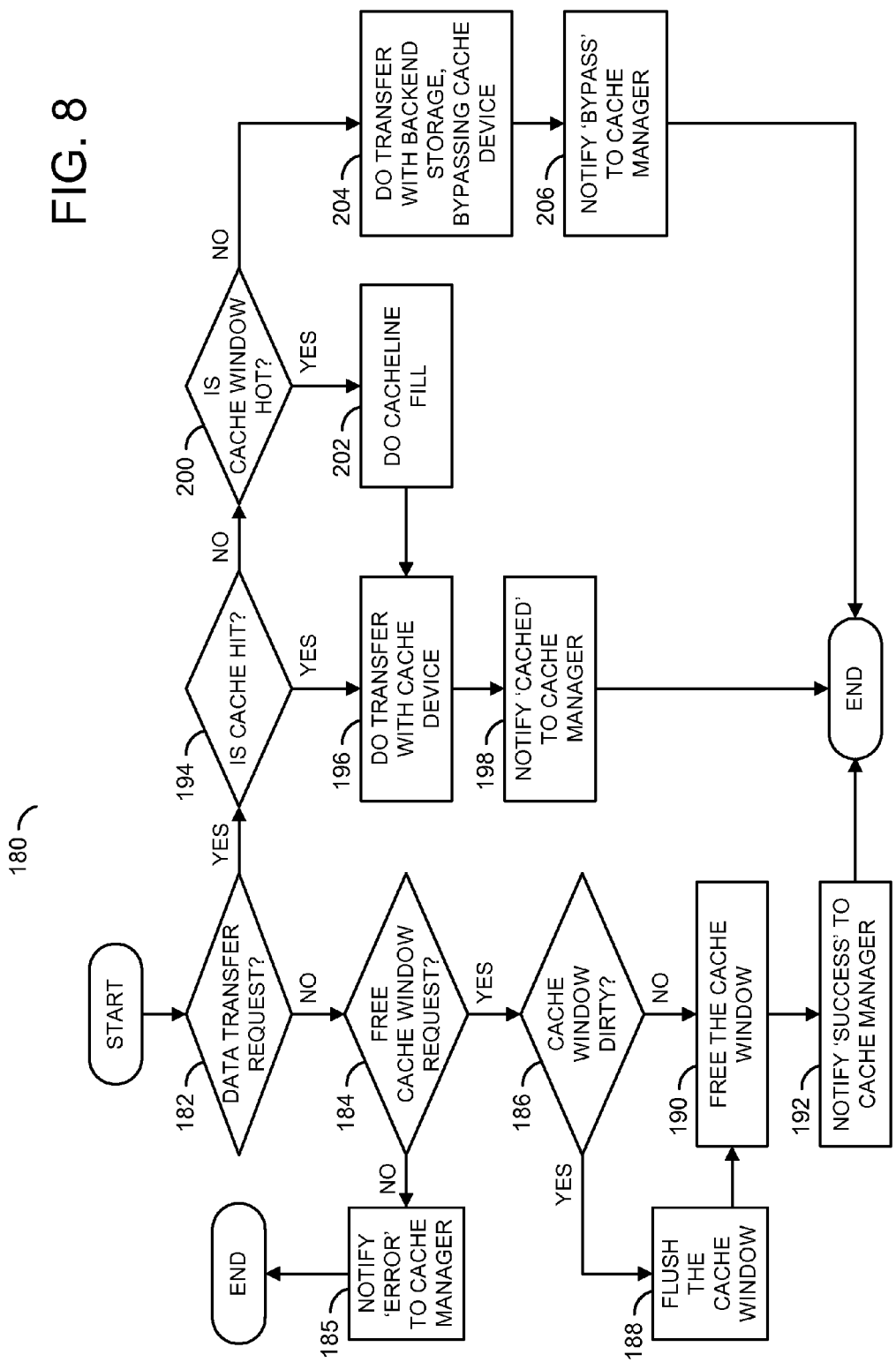
FIG. 8 is a diagram of a method for handling a cache device.

Referring to FIG. 8, a diagram of an example method 180 for handling the circuit 96 is shown. The method (or process) 180 is performed by the circuit 100. The method 180 generally comprises a step (or state) 182, a step (or state) 184, a step (or state) 185, a step (or state) 186, a step (or state) 188, a step (or state) 190, a step (or state) 192, a step (or state) 194, a step (or state) 196, a step (or state) 198, a step (or state) 200, a step (or state) 202, a step (or state) 204, and a step (or state) 206. The steps 182-206 may be represented as modules and/or blocks, embodiments of which include hardware (circuitry), code (e.g., hardware description languages (HDLs) such as register-transfer level (RTL), Verilog, etc.) used by one or more electronic design tools, computer executable code in a storage device, software and associated hardware executing the software, and/or other implementations.

The circuit 100 is responsible for managing the circuit 96 corresponding to the cache policy instances. The circuit 100 handles the requests from the circuit 92 for data transfers or freeing cache windows. In the step 182, a received access request is examined by the circuit 100 (e.g., the circuit 104) to determine if the access request is to transfer data. If no data transfer has been requested, the circuit 100 checks in the step 184 to see if the request is to free a cache window. If false, the circuit 100 notifies the circuit 104 of an error in the step 185. If true, the circuit 100 determines in the step 186 if the cache window is dirty or not. Data in a dirty window is flushed to the circuit 94 in the step 188. Once flushed, or if already clean, the cache window is freed by the circuit 100 in the step 190. A success notification is provided to the circuit 104 in the step 192.

If the incoming request is found to be a data request in the step 182, the circuit 100 checks for a hit/miss in the circuit 96 per the step 194. If a cache hit is detected, the transfer is serviced in the step 196 using the data already in the circuit 96. A notification is sent in the step 198 to the circuit 104 indicating that the data was found in the cache.

If a cache miss is detected in the step 194, the circuit 100 performs a check in the step 200 to determine if the cache window is hot or not. If the cache window is hot, the circuit 100 performs a cacheline fill from the circuit 94 into the circuit 96 in the step 202. The amount of fill is generally defined in the cacheline fill parameter of the policy instance. The method 180 continues with the step 196 to service the request with data from the circuit 96.

If the cache window is not hot, the circuit 100 commands a transfer of the requested data from the circuit 94 to the circuit in the step 204. The transfer from the circuit 94 to the circuit 92 generally bypasses the circuit 96 so no copy of the requested data is cached. A bypass notification is provided to the circuit 104 in the step 206.

Various embodiments of the circuit 100 create a master (or main or initial) cache policy by grouping several management parameters together. Multiple (e.g., two or more) cache policy instances are subsequently created from the master cache policy. Each cache policy instance is initialized by customizing the management parameters. The host can control the number of cache policy instances and initialize each instance. The management parameters may include, but are not limited to: a replacement policy parameter (e.g., MRU, LRU); a caching policy parameter (e.g., sticky, volatile, no cache; priority; and read-write-discard), cacheline fill (e.g., fill size in kilobytes); subcacheline size (e.g., size in kilobytes); cacheline size (e.g., size in kilobytes); cache window size (e.g., size in megabytes); policy preemption (e.g., true, false) and cache space reserved (e.g., size in percentage).

A handler is created for each cache policy instance, which treats the data based on the applicable cache parameters within the corresponding cache policy instance. The hints received from the circuit 92 point to the various cache policy instances. The resources in the circuit 100 (e.g., DRAM and CPU) and the cache device (e.g., the circuit 96) may be divided among cache policy instances in various embodiments. The policy preemption parameter generally allows removing a cache window from an existing cache policy instance and moving to a new cache policy instance.

The cache management parameter cache space reserved indicates the percentage of cache space that will be reserved for each respective cache policy instance. The parameters cache window size, cacheline size, and subcacheline size generally indicate the size of a cache window, the cacheline and the subcacheline, respectively, for a given cache policy instance.

The host data carries a hint that indicates (points to) the cache policy instance. Based on the hint, the cache manager (e.g., cache software executing in the controller) applies the cache management parameters from the corresponding cache policy instance to the host data. Each cache policy instance has a handler, which can be executed in separate operating system tasks or in a common task. The policy filter component in the caching software generally helps the caching software to route the host data request to the correct handler managing the cache policy instance.

The functions performed by the diagrams of FIGS. 1-8 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
    an interface configured to receive a request to access a memory, wherein said request comprises a hint; and
    a circuit configured to (i) select a current one of a plurality of cache policies based on said hint, wherein said current cache policy comprises a number of current parameters ranging from some to all of a plurality of management parameters of a cache device, and (ii) cache data of said request based on said current cache policy,
    wherein said plurality of management parameters include a cache space reserved parameter that indicates a percentage of cache space that is reserved for at least one of the plurality of cache policies,
    wherein said circuit is configured to determine a cache window for caching said data,
    wherein said circuit includes a cache policy filter configured to track a number of the cache window, and
    wherein said circuit is configured to derive said number of the cache window by dividing a block number of the request by a size of a smallest cache window from among the plurality of cache policies.

2. The apparatus of claim 1,
    wherein said cache policy filter is configured to track a cache policy applied on said cache window.

3. The apparatus according to claim 1, wherein said circuit is further configured to generate an initial policy by grouping said some to all of said management parameters.

4. The apparatus according to claim 3, wherein said circuit is further configured to generate said cache policies by instantiating said initial policy and customizing said management parameters in each of said cache policies.

5. The apparatus according to claim 1, wherein said circuit is further configured to associate a particular one of said cache policies with a window defined in said cache device.

6. The apparatus according to claim 5, wherein said circuit is further configured to replace said current cache policy with said particular cache policy to access said window in response to a policy preemption parameter of said management parameters.

7. The apparatus according to claim 1, wherein said plurality of management parameters include the cache space reserved parameter for each one of the plurality of cache policies, and wherein said circuit is further configured to reserve a respective space in said cache device corresponding to each of said cache policies based on the cache space reserved parameter.

8. The apparatus according to claim 1, wherein said management parameters comprise (i) a cache window size, (ii) a cacheline size and (iii) a subcacheline size.

9. The apparatus according to claim 1, wherein said management parameters comprise one or more of (i) a least-recently-used replacement parameter and (ii) a most-recently-used replacement parameter.

10. The apparatus according to claim 1, wherein said apparatus is implemented as one or more integrated circuits.

11. A method for hint selection of a caching policy, comprising the steps of:
    (A) receiving a request at a controller to access a memory, wherein said request comprises a hint;
    (B) selecting a current one of a plurality of cache policies based on said hint, wherein said current cache policy comprises a number of current parameters ranging from some to all of a plurality of management parameters of a cache device; and
    (C) caching data of said request based on said current cache policy, wherein said plurality of management parameters include a cache space reserved parameter that indicates a percentage of cache space that is reserved for at least one of the plurality of cache policies,
    wherein the caching includes:
        determining a cache window for caching said data;
        tracking a number of the cache window; and
        deriving said number of the cache window by dividing a block number of the request by a size of a smallest cache window from among the plurality of cache policies.

12. The method according to claim 11, further comprising the step of:
    generating an initial policy by grouping said some to all of said management parameters.

13. The method according to claim 12, further comprising the step of:
    generating said cache policies by instantiating said initial policy and customizing said management parameters in each of said cache policies.

14. The method according to claim 11, further comprising the step of:

associating a particular one of said cache policies with a window defined in said cache device.

15. The method according to claim 14, further comprising the step of:

replacing said current cache policy with said particular cache policy to access said window in response to a policy preemption parameter of said management parameters.

16. The method according to claim 11, further comprising the step of:

reserving a respective space in said cache device corresponding to each of said cache policies.

17. The method according to claim 11, wherein said management parameters comprise (i) a cache window size, (ii) a cacheline size and (iii) a subcacheline size.

18. The method according to claim 11, wherein said management parameters comprise one or more of (i) a least-recently-used replacement parameter and (ii) a most-recently-used replacement parameter.

19. An apparatus comprising:

a host interface configured to receive a request to access a memory, wherein said request comprises a hint; and at least one processor configured to, select a current one of a plurality of cache policies based on said hint, wherein said current cache policy comprises a number of current parameters ranging from some to all of a plurality of management parameters of a cache device, and cache data of said request based on said current cache policy, wherein said plurality of management parameters include a cache space reserved parameter that indicates a percentage of cache space that is reserved for at least one of the plurality of cache policies wherein the at least one processor is configured to cache data of said request by:

determining a cache window for caching said data;

tracking a number of the cache window; and deriving said number of the cache window by dividing a block number of the request by a size of a smallest cache window from among the plurality of cache policies.

* * * * *